US008864590B2

(12) United States Patent
Sugiyama et al.

(10) Patent No.: US 8,864,590 B2
(45) Date of Patent: Oct. 21, 2014

(54) PROPELLER SHAFT AND CONSTANT VELOCITY UNIVERSAL JOINT USED THEREIN

(71) Applicant: Hitachi Automotive Systems Kyushu, Ltd., Fukuoka (JP)

(72) Inventors: Kenichi Sugiyama, Atsugi (JP); Takahiro Kuroha, Atsugi (JP); Yasutomo Mabe, Isehara (JP)

(73) Assignee: Hitachi Automotive Systems Kyushu, Ltd., Fukuoka (JP)

( * ) Notice: Subject to any disclaimer, the term of this patent is extended or adjusted under 35 U.S.C. 154(b) by 0 days.

(21) Appl. No.: 13/795,163

(22) Filed: Mar. 12, 2013

(65) Prior Publication Data
US 2013/0252746 A1  Sep. 26, 2013

(30) Foreign Application Priority Data

Mar. 21, 2012 (JP) ................. 2012-064316

(51) Int. Cl.

| | |
|---|---|
| F16D 3/227 | (2006.01) |
| F16D 1/116 | (2006.01) |
| F16C 1/04 | (2006.01) |
| F16D 3/38 | (2006.01) |
| F16D 3/223 | (2011.01) |
| F16D 3/205 | (2006.01) |
| F16B 21/18 | (2006.01) |

(52) U.S. Cl.
CPC ......... *F16C 1/04* (2013.01); *F16D 2003/22326* (2013.01); *F16D 3/2055* (2013.01); *F16D 3/223* (2013.01); *F16D 1/116* (2013.01); *F16B 21/183* (2013.01); *F16D 2300/08* (2013.01); *F16D 3/387* (2013.01); *Y10S 464/906* (2013.01)

USPC .......................... 464/146; 464/906; 403/359.5

(58) Field of Classification Search
USPC ......... 464/134, 136, 182, 901, 905, 906, 146; 403/326, 359.5, DIG. 4, DIG. 7
See application file for complete search history.

(56) References Cited

U.S. PATENT DOCUMENTS

| | | | | | |
|---|---|---|---|---|---|
| 2,140,295 | A | * | 12/1938 | Mallard | ............... 464/182 X |
| 3,357,206 | A | * | 12/1967 | Christie | ............... 464/136 X |

(Continued)

FOREIGN PATENT DOCUMENTS

| | | |
|---|---|---|
| JP | 9-112565 A | 5/1997 |
| JP | 2002-235768 A | 8/2002 |
| JP | 2010-95223 A | 4/2010 |
| JP | 2011-122614 A | 6/2011 |

OTHER PUBLICATIONS

Universal Joint and Driveshaft Design Manual, AE-7, Society of Automotive Engineers, Inc., pp. 99-101, TJ1079.S62 1979.*

*Primary Examiner* — Gregory Binda
(74) *Attorney, Agent, or Firm* — Crowell & Moring LLP

(57) ABSTRACT

A propeller shaft is proposed which comprises an outer cylindrical member formed with a sleeve portion that has a splined cylindrical inner wall with which a splined cylindrical outer wall of a shaft is engaged; an inner cylindrical member installed in the outer cylindrical member; a torque transmitting unit through which a torque is transmitted from the outer cylindrical member to the inner cylindrical member; and a connecting mechanism that, upon engagement of the splined cylindrical outer wall with the splined cylindrical inner wall, effects an axial and relative positioning between the shaft and the outer cylindrical member while establishing a detachable connection therebetween.

11 Claims, 10 Drawing Sheets

(56) References Cited

U.S. PATENT DOCUMENTS

| | | |
|---|---|---|
| 6,193,419 B1 * | 2/2001 | Krude et al. |
| 6,241,616 B1 * | 6/2001 | Lightcap ............... 403/359.5 X |
| 8,425,142 B2 * | 4/2013 | Disser ....................... 403/359.5 |
| 2009/0297083 A1 * | 12/2009 | Raberin et al. |

* cited by examiner

PROPELLER SHAFT AND CONSTANT VELOCITY UNIVERSAL JOINT USED THEREIN

BACKGROUND OF THE INVENTION

1. Field of the Invention

The present invention relates to a propeller shaft and a constant velocity universal joint used therein, which are used in wheeled motor vehicles.

2. Description of the Related Art

Usually, the propeller shaft for the wheeled motor vehicle has a split construction including a drive shaft that is adapted to connect to an output shaft of a transmission, a driven shaft that is adapted to connect to a differential gear and a coupling mechanism, such as Cardin joint, constant velocity universal joint or the like, that is operatively disposed between mutually facing ends of the drive and driven shafts. In practical use, an axially middle portion of the propeller shaft is rotatably held by a support device fixed to a body of the vehicle.

Usually, as is disclosed by, for example, Japanese Laid-open Patent Application (Tokkai) 2010-95223, for connecting the drive shaft of a propeller shaft to an output shaft of the transmission, bolts and flanges (viz., companion flange) are used.

SUMMARY OF THE INVENTION

In case of using the bolts and flanges for such connection, the size of each bolt and the number of the bolts are determined by taking an input torque from the transmission and an output torque from the drive shaft into consideration. That is, when using the bolts, it is necessary to ensure a sufficient connecting surface provided by the bolts and flanges by considering P.C.D. (viz., pitch circle diameter) of the bolts used therefor.

Thus, in case of using the bolts for the connection, the weight of connected portions is increased and the number of parts used is also increased, which cause increase in production cost of the propeller shaft. Furthermore, if bolt holes are not properly made, bolt looseness tends to occur. Of course, in such case, for assuring a secured and reliable connection by the bolts, the cycle time needed for the assured bolt connection is inevitably increased, which brings about increase in the production cost of the propeller shaft.

Accordingly, the present invention is provided by taking the above-mentioned drawbacks of the conventional technology into consideration and aims to provide for example a propeller shaft in which a driven shaft (or input shaft) and a constant velocity universal joint are connected through a unique connector without usage of bolts while assuring a reliable torque transmission from the driven shaft to the joint as well as a stable axial and relative positioning between the driven shaft and the joint.

In accordance with a first aspect of the present invention, there is provided a propeller shaft that comprises an outer cylindrical member formed with a sleeve portion, the sleeve portion having a splined cylindrical inner wall with which a splined cylindrical outer wall of a shaft is engaged; an inner cylindrical member installed in the outer cylindrical member; a torque transmitting unit through which a torque is transmitted from the outer cylindrical member to the inner cylindrical member; and a connecting mechanism that, upon engagement of the splined cylindrical outer wall with the splined cylindrical inner wall, effects an axial and relative positioning between the shaft and the outer cylindrical member while establishing a detachable connection therebetween.

In accordance with a second aspect of the present invention, there is provided a propeller shaft which comprises an outer cylindrical member formed with a sleeve portion, the sleeve portion having a splined cylindrical inner wall into which a splined cylindrical outer wall of a shaft is inserted to establish a spline coupling therebetween; an inner cylindrical member connected to the outer cylindrical member through a torque transmitting unit thereby to allow a torque transmission from the outer cylindrical member to a shaft member through the inner cylindrical member and the rotating members; a boot having an outer peripheral portion secured to the outer cylindrical member and an inner peripheral portion secured to the inner cylindrical member thereby to hold in the outer cylindrical member a grease; a connecting mechanism that connects the shaft and the outer cylindrical member while establishing an axial and relative positioning therebetween; and a seal member that establishes a hermetical sealing between an inner cylindrical wall of the sleeve portion and an outer cylindrical wall of the shaft, wherein the connecting mechanism is arranged between the seal member and the inner cylindrical member.

In accordance with a third aspect of the present invention, there is provided a constant velocity universal joint which comprises a first coupling member formed with a sleeve portion, the sleeve portion having a splined cylindrical inner wall with which a splined cylindrical outer wall of a shaft is engaged; a second coupling member installed in the first coupling member; a torque transmitting member interposed between the first and second coupling members thereby to carry out a torque transmission therebetween; and a connecting mechanism that effects an axial and relative positioning between the shaft (2) and the first coupling member while establishing a detachable connection therebetween.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, various embodiments of the present invention will be described in detail with reference to the accompanying drawings.

In the following description, various directional terms, such as right, left, upper, lower, rightward and the like are used for ease of explanation. It is however to be noted that such terms are to be understood with respect to only a drawing or drawings on which a corresponding element or portion is shown.

Referring to FIGS. 1 to 5, there is shown a propeller shaft is which is a first embodiment of the present invention.

Figure 5:
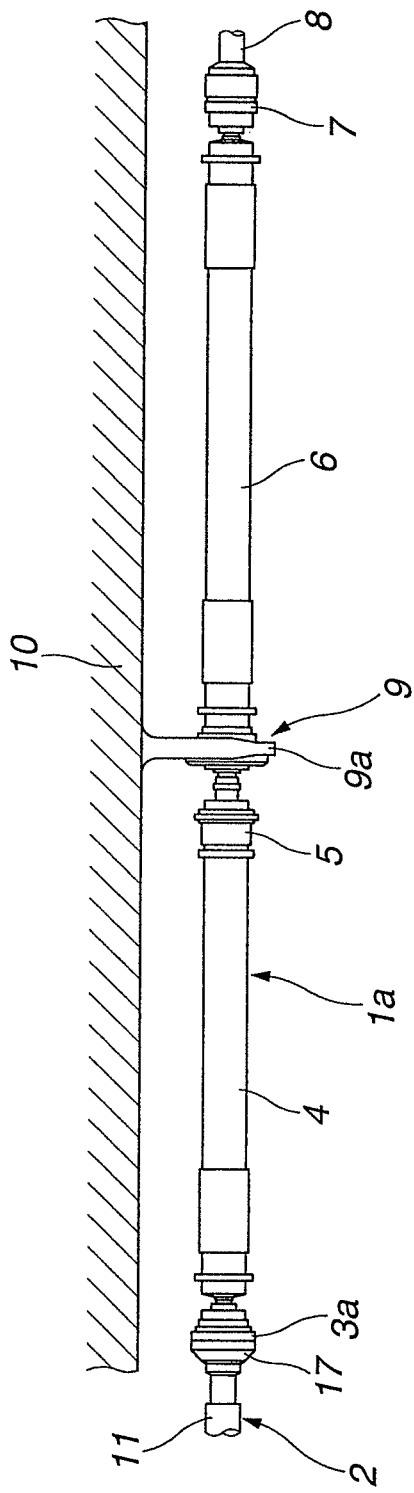
FIG. 5 is a side view of an entire construction of the propeller shaft which is the first embodiment of the present invention.

As is seen from FIG. 5, propeller shaft is comprises an input shaft 2 that is adapted to connect to an output shaft of a transmission (not shown) mounted on a motor vehicle, a drive shaft 4 that is connected to input shaft 2 through a first constant is velocity universal joint 3a, a driven shaft 6 that is connected to drive shaft 4 through a second constant velocity universal joint 5 and an output shaft 8 that is connected to driven shaft 6 through a third constant velocity universal joint 7 and connected to an input shaft of a differential gear (not shown). As shown, when propeller shaft is practically used, a center bearing 9 holding a generally middle portion of propeller shaft is supported by a vehicle body 10 through a bracket 9a. In the illustrated embodiment, center bearing 9 holds driven shaft 6 at a position near second constant velocity universal joint 5.

Figure 1:
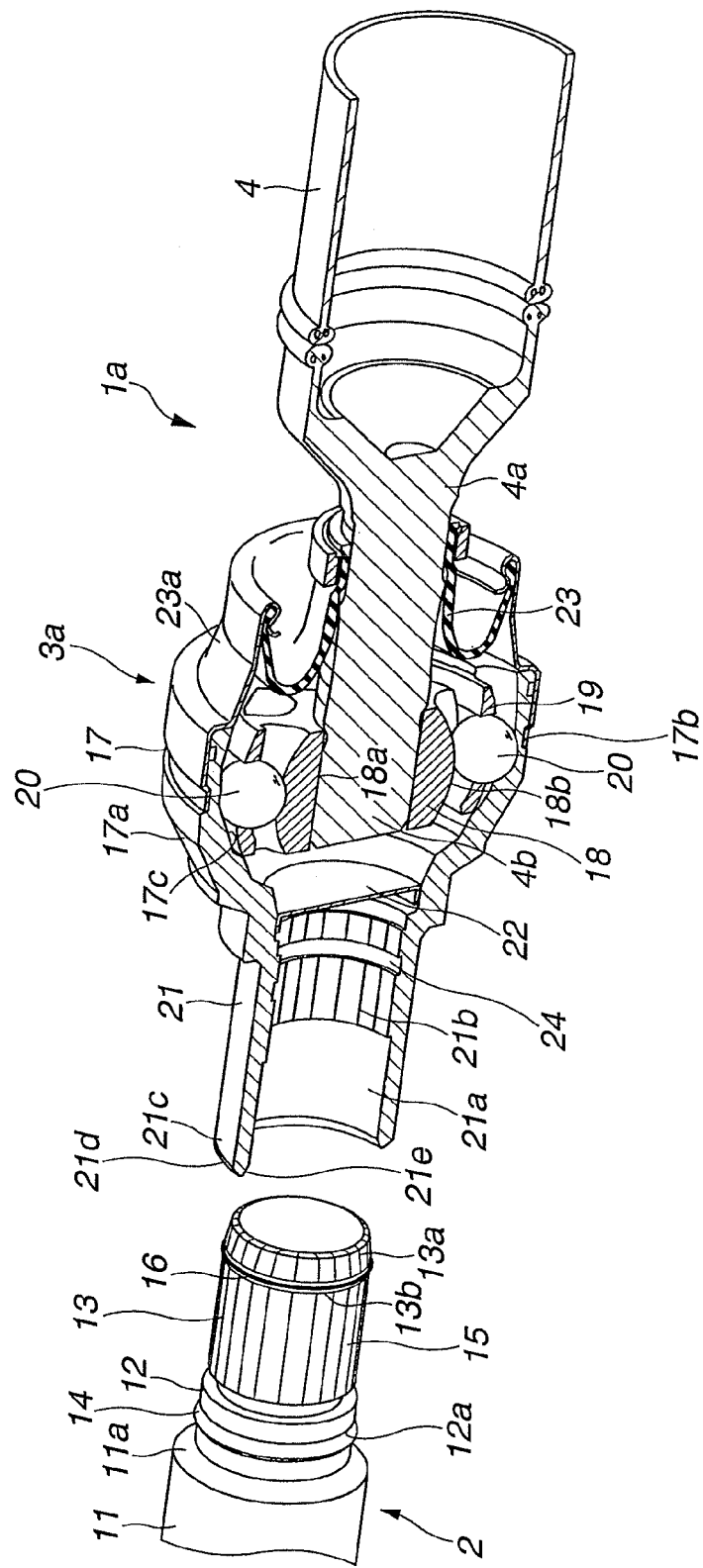
FIG. 1 is a partially sectioned and partially exploded perspective view of a front assembly of a propeller shaft of a first embodiment of the present invention.
Figure 2:
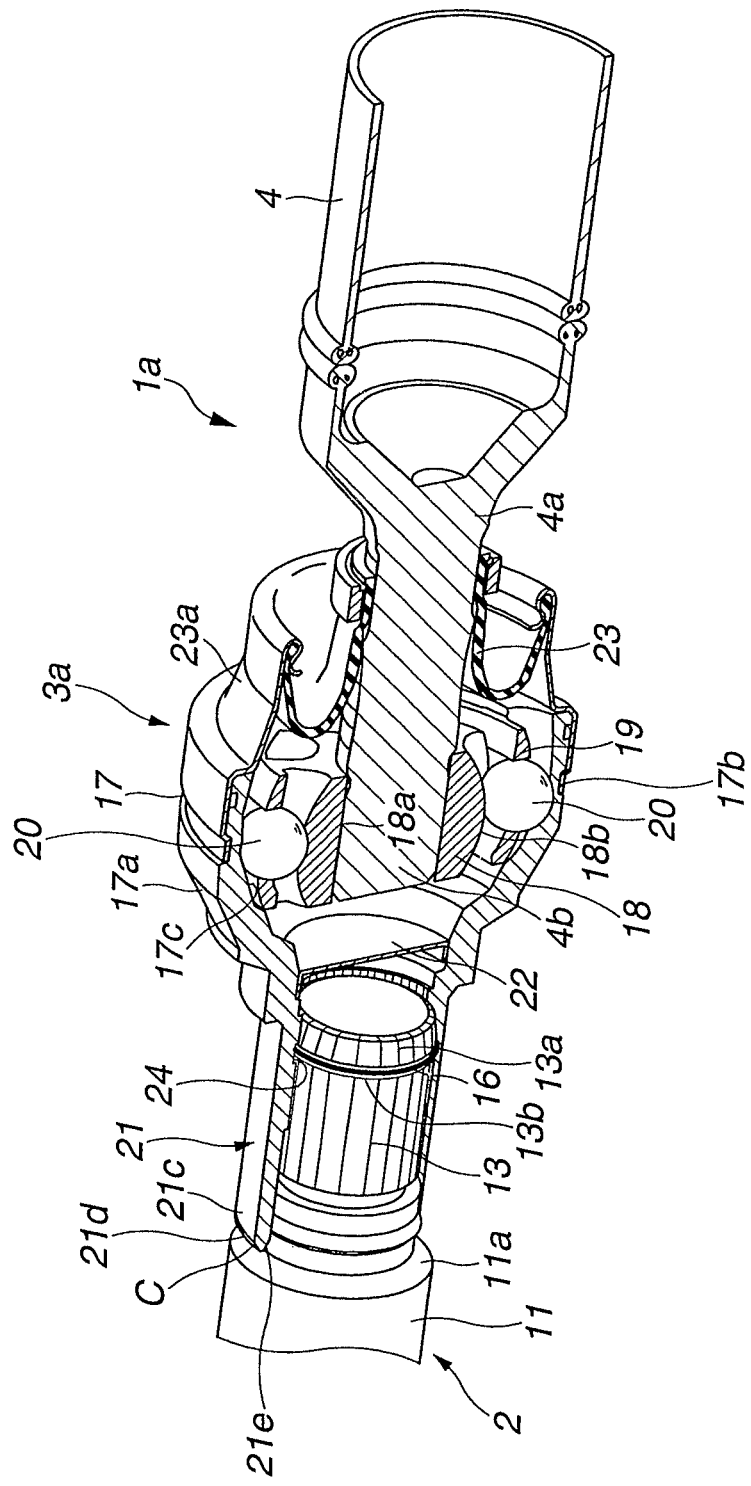
FIG. 2 is a view similar to FIG. 1, but showing a condition in which an input shaft is coupled with a first constant velocity universal joint.

As is seen from FIGS. 1 and 2, input shaft 2 has a stepped right end portion and comprises a larger diameter shaft portion 11 with an annular flat surface 11a facing right, a medium diameter intermediate portion 12 integral with larger diameter shaft portion 11 and a smaller diameter right end portion 13 integral with medium diameter intermediate portion 12.

As shown in the drawings, medium diameter intermediate portion 12 is relatively short in axial length. A cylindrical outer surface of medium diameter intermediate portion 12 is formed at an axially middle part thereof with an annular groove 12a and an annular seal ring 14 made of a synthetic rubber is tightly received in annular groove 12a.

Smaller diameter right end portion 13 is longer than medium diameter intermediate portion 12, as shown. A cylindrical outer surface of smaller diameter right end portion 13 is splined, that is, the cylindrical outer surface is formed with a plurality of axially extending splines 15. As shown, smaller diameter right end portion 13 forms at its leading portion a tapered end 13a.

Figure 3:
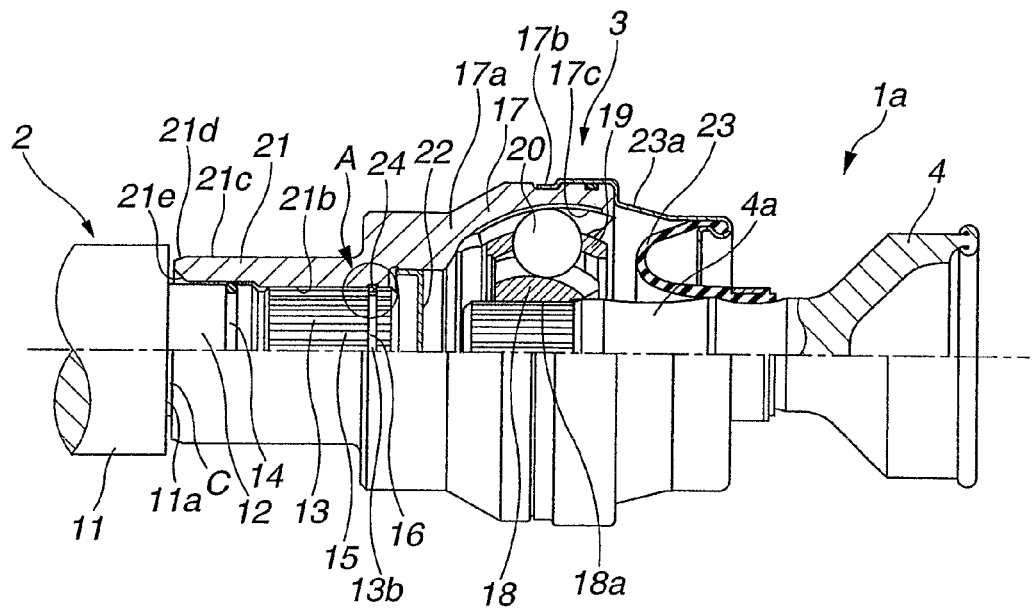
FIG. 3 is a sectional view of an essential part of the front assembly of the propeller shaft of the first embodiment where the input shaft, a drive shaft and the first constant velocity universal joint are properly assembled.
Figure 4:
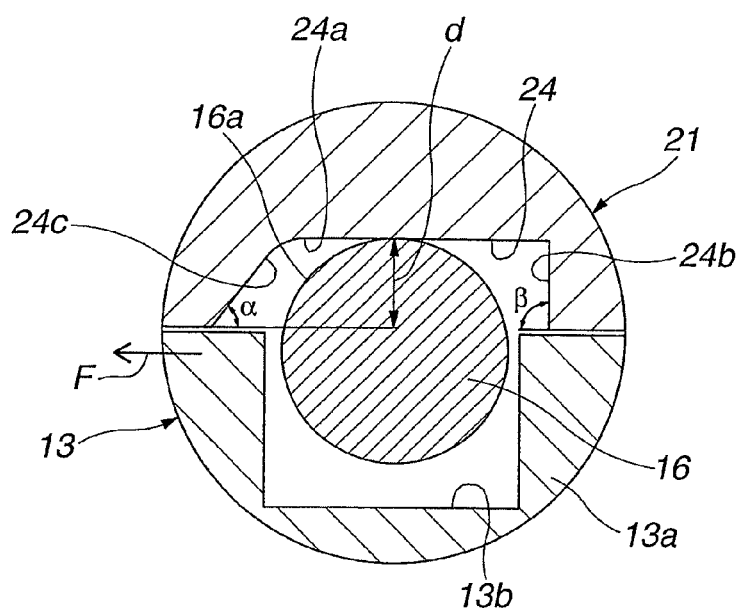
FIG. 4 is an enlarged sectional view of the part enclosed by a circle indicated by an arrow "A" in FIG. 3.

As is seen from FIGS. 3 and 4, an annular groove 13b is formed around a boundary part between tapered end 13a and smaller diameter right end portion 13. Annular groove 13b has a generally rectangular cross section as shown in FIG. 4. A snap is ring (or circlip) 16 is tightly received in annular groove 13b for the purpose that will be clarified hereinafter.

Snap ring 16 is made of a resilient metal and has a generally circular cross section. Although not shown in the drawings, snap ring 16 has both ends that are movable relative to each other to vary the diameter of snap ring 16.

As is seen from FIGS. 1 to 3, particularly FIG. 3, first constant velocity universal joint 3a generally comprises an outer cylindrical member (or first coupling member) 17 that has a left end connected to input shaft 2, an inner cylindrical member (or second coupling member) 18 that is installed in outer cylindrical member 17 and connected to a stub shaft 4a of drive shaft 4 and a plurality of balls 20 that are rotatably disposed between the two cylindrical members 17 and 18 to serve as torque transmitting means and rotatably held by a circular cage 19.

As is seen from FIG. 3, outer cylindrical member 17 comprises a cup-shaped main portion 17a and a sleeve portion 21 that projects leftward, that is, toward input shaft 2. Cup-shaped main portion 17a is formed at its outer cylindrical surface with an annular groove 17b. An inner surface 17c of cup-shaped main portion 17a is shaped to have an arcuate cross section so that the outer cylindrical member 17 is pivotal about a unit of balls 20.

Within cup-shaped main portion 17a, there is press-fitted a circular seal cap 22 at a position near sleeve portion 21, and between a right end of the main portion 17a and stub shaft 4a, there is arranged a rubber boot 23 through a metal retainer 23a. With presence of rubber boot 23 and seal cap 22, a grease is held in a space defined between outer and inner cylindrical members 17 and 18, so that balls 20 are sufficiently applied with the grease. As shown, a left end of metal retainer 23a is tightly put in the above-mentioned annular groove 17b.

As is seen from FIG. 3, sleeve portion 21 of outer cylindrical member 17 projects leftward, that is, toward input shaft 2 and receives therein the medium diameter intermediate portion 12 and smaller diameter right end portion 13 of input shaft 2 to effect a tight connection therebetween. As shown, a cylindrical inner wall of sleeve portion 21 is stepped to snugly receive therein both the intermediate portion 12 and the right end portion 13 of input shaft 2.

As is best seen in FIG. 1, a larger diameter cylindrical space of sleeve portion 21 into which the intermediate portion 12 of input shaft 2 is received has a smoothed cylindrical wall 21a, while a smaller diameter cylindrical space of sleeve portion 21 into which the right end portion 13 of input shaft 2 is received has a splined cylindrical wall 21b with which the above-mentioned splined outer surface of the right end portion 13 is axially slidably engaged while suppressing relative rotation therebetween. As shown, cylindrical splined wall 21b is formed therearound with an annular groove 24 into which the above-mentioned snap ring 16 is tightly received upon proper coupling between input shaft 2 and the universal joint 3a.

As is seen from FIG. 4, annular groove 24 is shaped to have a generally trapezoidal cross section. A depth "d" of annular groove 24 to a bottom wall 24a is determined about ⅔ of the diameter of snap ring 16. As shown, a right side wall 24b of annular groove 24 is perpendicular (viz., β=90 degrees) to bottom wall 24a and a left side wall 24c of annular groove 24 is inclined about 50 degrees (viz., α=50 degrees) relative to bottom wall 24a.

Accordingly, if a certain force is applied to input shaft 2 in a direction of the arrow "F" causing a leftward movement of the right end portion 13 and abutment of snap ring 16 with the inclined left side wall 24c of annular groove, snap ring 16 is forced to reduce its diameter permitting disengagement of input shaft 2 from sleeve portion 21 of outer cylindrical member 17.

Referring back to FIG. 3, a peripheral outer edge 21d of a left end part 21c of sleeve portion 21 is tapered to facilitate the work for putting a tip of a special pick (not shown) into a thin space "C" that would be formed between annular flat surface 11a of input shaft 2 and left end part 21c of sleeve portion 21. Furthermore, a peripheral inner edge 21e of left end part 21c of sleeve portion 21 is also tapered to facilitate insertion of the right end portion 13 of input shaft 2 into sleeve portion 21 of outer cylindrical member 17.

As will be understood from the above description, snap ring 16 and annular groove 24 constitute a connecting mechanism by which unexpected displacement of input shaft 2 from sleeve portion 21 of outer cylindrical member 17 is suppressed. Furthermore, splines 15 of the right end portion 13 of input shaft 2 and splines 21b of sleeve portion 21 of outer cylindrical member 17 constitute another connecting mechanism by which the two members 2 and 17 can rotate together like a single unit while permitting relative movement in an axial direction.

As is seen from FIGS. 2 and 3, when the right end portion 13 and the intermediate portion 12 of input shaft 2 are deeply inserted into sleeve portion 21 of outer cylindrical member 17 while establishing proper engagement between the splines 15 and 21b, there is formed or defined an annular thin space "C" between annular flat surface 11a of input shaft 2 and left end part 21c of sleeve portion 21.

As is seen from FIGS. 1, 2 and 3, the above-mentioned inner cylindrical member 18 is formed with a center through bore 18a through which a front part 4b of the above-mentioned stub shaft 4a of drive shaft 4 passes. Although not well shown in the drawings, center through bore 18a and front part 4b of stub shaft 4a are connected through a spline coupling.

Inner cylindrical member 18 has a convex outer surface 18b on which balls 20 roll.

Although first constant velocity universal joint 3a is constructed not to permit axial movement of stub shaft 4a of drive shaft 4 relative thereto, the joint 3a permits a slight swing of stub shaft 4a relative thereto.

It is to be noted that second and third constant velocity universal joints 5 and 7 are each constructed to make an axial displacement by a given distance. With such axial length adjustable construction of the joints 5 and 7, mounting of propeller shaft is onto vehicle body 10 can be easily made.

In the following, assembling steps for propeller shaft 1a and operation of first constant velocity universal joint 3a will be described with the aid of the drawings.

First, by using a common method, stub shaft 4a of drive shaft 4 is press-fitted in center through bore 18a of inner cylindrical member 18 of first constant velocity universal joint 3a.

Then, as will be understood from FIG. 1, input shaft 2 is connected to first constant velocity universal joint 3a.

For this connection, the right end portion 13 of input shaft 2 is inserted into left end part 21c of sleeve portion 21 of outer cylindrical member 17. During this insertion, snap ring 16 resiliently disposed in annular groove 13b formed on the smaller diameter right end portion 13 of input shaft 2 is forced to slide on and along smoothed cylindrical wall 21a and then on and along cylindrical splined wall 21b of sleeve portion 21 while being compressed in a direction to reduce its diameter. At the latter stage of the insertion, engagement between splines 15 and 21b is to deeply made while receiving a counter force.

Under this sliding, snap ring 16 is kept compressed pressing its outer portion against cylindrical splined wall 21b.

However, as is seen from FIGS. 2 to 4, when, after travelling in sleeve portion 21, the right end portion 13 arrives at the is position of annular groove 24, snap ring 16 is permitted to expand radially outward and engaged with annular groove 24. Upon this, stable connection between input shaft 2 and first constant velocity universal joint 3a is established. It is to be noted that as is seen from FIG. 4, under this engaged condition, snap ring 16 is kept compressed having its outer part in contact with bottom wall 24a of annular groove 24.

With the above-mentioned assembling steps, input shaft 2 and first constant velocity universal joint 3a are coupled together with the aid of the spline coupling effected by splines 15 and 21b and the resilient engagement of snap ring 16 with annular groove 24. Of course, under this condition, unexpected disengagement of input shaft 2 from sleeve portion 21 is suppressed.

That is, input shaft 2 and first constant velocity universal joint 3a are operatively connected through the engagement between splines 15 and 21b and the engagement between snap ring 16 and annular groove 24. In other words, in the first embodiment of the invention, for operatively connecting input shaft 2 and the universal joint 3a, no bolts are used. That is, in this first embodiment, a torque transmission from input shaft 2 to drive shaft 4 is assuredly carried out without usage of any connecting bolts.

When smaller diameter right end portion 13 is sufficiently inserted into sleeve portion 21, snap ring 16 is brought into engagement with annular groove 24, so that an axial movement of the right end portion 13 relative to outer cylindrical member 17 is suppressed. That is, upon assembling, axial positioning of the right end portion 13 relative to outer cylindrical member 17 is assured.

As will be understood from the foregoing description, the engagement of snap ring 16 with annular groove 24 is effected by simply pushing inlet shaft 2 into sleeve portion 21 of outer cylindrical member 17. That is, the work for connecting input is shaft 2 with outer cylindrical member 17 is very easy.

As is seen from FIG. 3, under the condition wherein input shaft 2 is deeply inserted into sleeve portion 21, annular seal ring 14 of synthetic rubber mounted on medium diameter intermediate portion 12 is pressed against smoothed cylindrical wall 21a (see FIG. 1) of sleeve portion 21, and thus, the interior of outer cylindrical member 17 is protected from the entry of muddy water, dusts and the like. Of course, due to provision of annular seal ring 14, leakage of the grease from the interior of outer cylindrical member 17 is suppressed.

Furthermore, since annular seal ring 14 is tightly held by annular groove 12a of the cylindrical outer surface of the intermediate portion 12 and arranged to seal an entire outer surface of the intermediate portion 12 for its sealing area, annular seal ring 14 can exhibit a satisfied sealing performance. Furthermore, since snap ring 16 is placed near the interior of outer cylindrical member 17 while keeping away from annular seal ring 14, snap ring 16 is sufficiently fed with the grease from the interior of outer cylindrical member 17, which suppresses corrosion of snap ring 16.

As is described hereinabove, in this first embodiment, the connection between input shaft 2 and first constant velocity universal joint 3a is made through the engagement between splines 15 and 21b and the holding function of snap ring 16 without usage of conventional bolts. Accordingly, in this embodiment, reduction in component count is delivered and thus weight reduction of propeller shaft 1a and efficient assembly operations for vehicles are achieved. Furthermore, due to presence of seal ring 14, the above-mentioned dust-tight and grease stopping performance is obtained.

Furthermore, as will be understood from FIG. 1, due to provision of the tapered end 13a of smaller diameter end portion 13 and the tapered peripheral inner edge 21e of sleeve portion 21, the smaller diameter end portion 13 of input shaft 2 can be easily and instantly guided into sleeve portion 21 of first constant velocity universal joint 3a, which brings about an easy and instant coupling between input shaft 2 and the joint 3a.

As will be understood from FIG. 3, in case of disengaging input shaft 2 from the joint 3a, a special pick (not shown) is handled to put its tip into the thin space "C" provided between annular flat surface 11a of input shaft 2 and left end part 21c of sleeve portion 21 and then the pick is pivoted in a certain direction using an outer end of annular flat surface 11. With this, input shaft 2 is shifted leftward "F" in FIG. 4 together with snap ring 16.

Due to the leftward movement, snap ring 16 is brought into abutment with the inclined left side wall 24c of annular groove 24, and thus thereafter the diameter of snap ring 16 gradually reduces as snap ring 16 slips down along the inclined left side wall 24c in accordance with the leftward movement of snap ring 16 together with input shaft 2. Once the leftward movement comes to a certain level, the diameter of snap ring 16 becomes sufficiently small to unlock the engagement between input shaft 2 and sleeve portion 21, and thus, thereafter, input shaft 2 is instantly disengaged from sleeve portion 21 of first constant velocity universal joint 3a.

Figure 6:
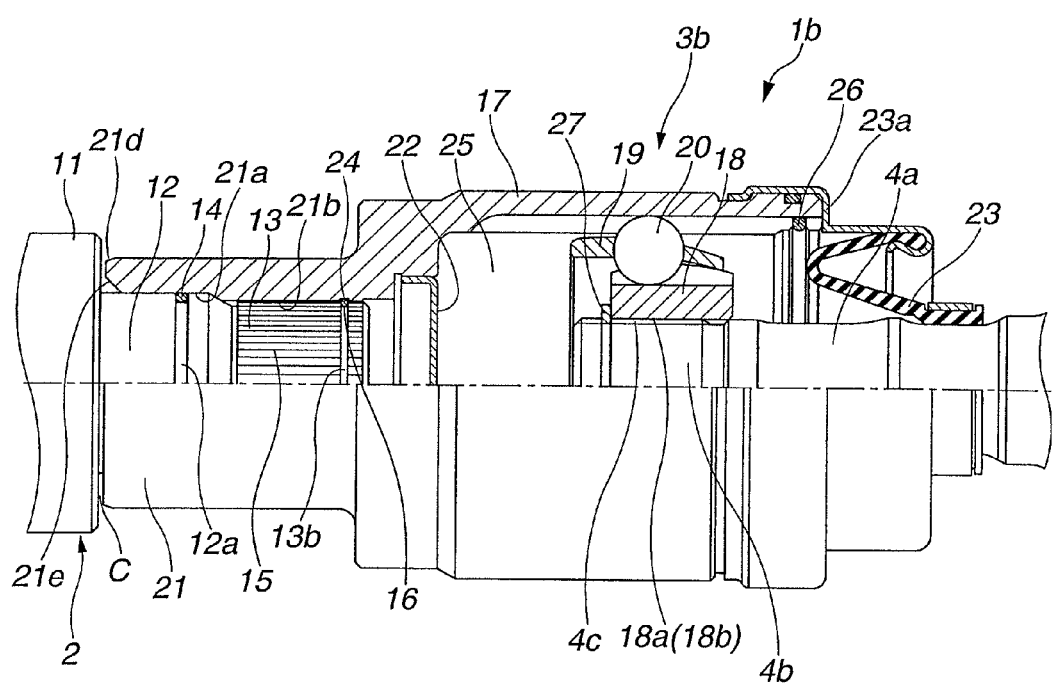
FIG. 6 is a view similar to FIG. 3, but showing an essential part of a front assembly of a propeller shaft of a second embodiment of the present invention.
Figure 7:
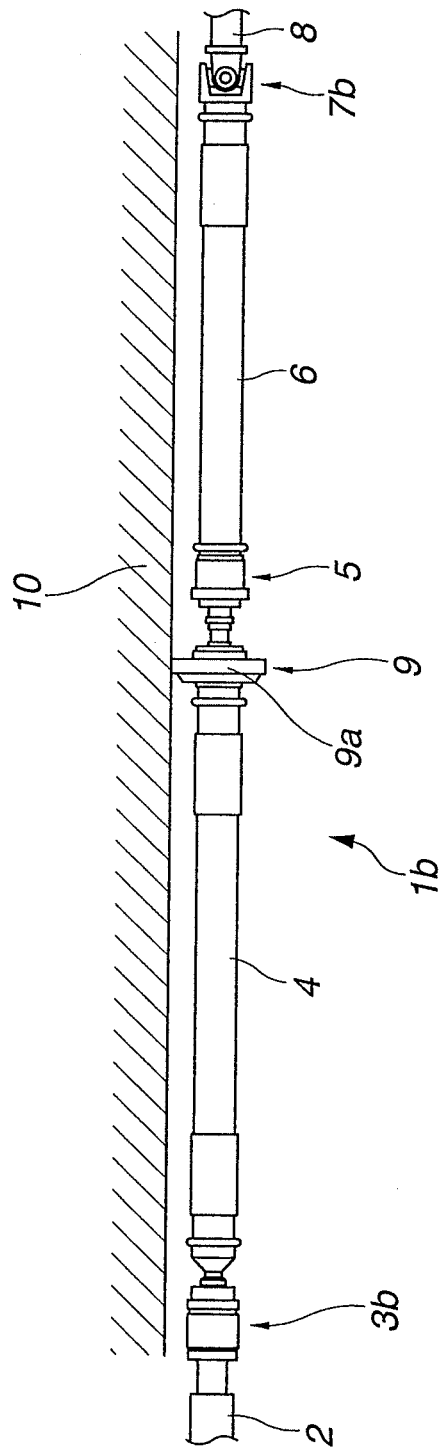
FIG. 7 is a side view of an entire construction of the propeller shaft of the second embodiment of the present invention.

Referring to FIGS. 6 and 7, there is shown a propeller shaft 1b which is a second embodiment of the present invention.

In this second embodiment, arrangement and construction of some joints are different from those of the above-mentioned first embodiment.

That is, in this second embodiment, as is seen from FIG. 6, the first constant velocity universal joint 3b is of a slide type and as is seen from FIG. 7, the second constant velocity universal joint 5 is arranged at a left side of driven shaft 6, and the right side joint is a Cardan joint 7b.

Referring back to FIG. 6, in the first constant velocity universal joint 3b used in this second embodiment, the outer cylindrical member 17 is elongated in an axial direction and the inner cylindrical member 18 is made generally cylindrical. Inner cylindrical member 18 has a center through bore 18a through which front part 4b of stub shaft 4a of drive shaft 4 passes. Like in the above-mentioned first embodiment, center through bore 18a and front part 4b of stub shaft 4a are connected through a spline coupling.

Between outer cylindrical member 17 and inner cylindrical member 18, there are rotatably arranged a plurality of balls 20 that are held by a circular cage 19.

As is seen from FIG. 6, within outer cylindrical member 17, there is defined a cylindrical space 25 in which a unit including inner cylindrical member 18, balls 10 and cage 19 is axially movable together with stub shaft 4a. Between a right end of outer cylindrical member 17 and stub shaft 4a, there is arranged a rubber boot 23 through a metal retainer 23a. At a right end wall of the cylindrical space 25, there is fixed an annular stopper ring 26 for limiting the rightmost movement of stub shaft 4a.

Thus, as is seen from FIG. 6, outer cylindrical member 17 and inner cylindrical member 18 (viz., stub shaft 4a) are permitted to make a relative and axial displacement therebetween, and due to presence of annular stopper ring 26, the relative axial displacement of the two member 17 and 18 is limited. That is, a length adjusting mechanism is constructed by such members 17, 18 and 26.

As is seen from FIG. 6, like in the above-mentioned first embodiment, outer cylindrical member 17 is formed at a left part thereof with a sleeve portion 21. Sleeve portion 21 has therein a cylindrical space that is defined by a smoothed cylindrical wall 21a and a cylindrical splined wall 21b, like in the first is embodiment. Cylindrical splined wall 21b is formed with an annular groove 24 into which a snap ring (or circlip) 16 received in an annular groove 13b of the right end portion 13 of input shaft 2 is tightly received.

Center through bore 18a of inner cylindrical member 18 has a splined cylindrical wall 18b with which a splined cylindrical outer wall 4c of front part 4b of drive shaft 4 is operatively engaged. Designated by numeral 27 is a snap ring that is tightly disposed on the front part 4b of drive shaft 4 to suppress disengagement of drive shaft 4 from inner cylindrical member 18.

Input shaft 2 has the same construction as that of the first embodiment, and thus has a larger diameter shaft portion 11, a medium diameter intermediate portion 12 and a smaller diameter right end portion 13. The cylindrical outer surface of medium diameter intermediate portion 12 is formed with an annular groove 12a for tightly receiving therein an annular seal ring 14. Right end portion 13 of input shaft 2 has a splined outer wall with which the cylindrical splined wall 21b of sleeve portion 21 is operatively engaged.

As will be understood from the above description, also in this second embodiment, input shaft 2 and first constant velocity universal joint 3b are operatively connected through engagement between splines 15 and 21b and the engagement between snap ring 16 and annular groove 24. In other words, also in this second embodiment, for operatively connecting input shaft 2 and the universal joint 3b, no bolts are used. That is, a torque transmission from input shaft 2 to drive shaft 4 is assuredly carried out without usage of any connecting bolts.

Within the interior of outer cylindrical member 17, stub shaft 4a of drive shaft 4 is axially movable together with inner cylindrical member 18 and balls 20. This axially movable construction facilitates the work for assembling propeller shaft 1b.

Also in this second embodiment, a second constant velocity universal joint 5 (see FIG. 7) is constructed to permit a relative axial movement in an axial direction.

Figure 8:
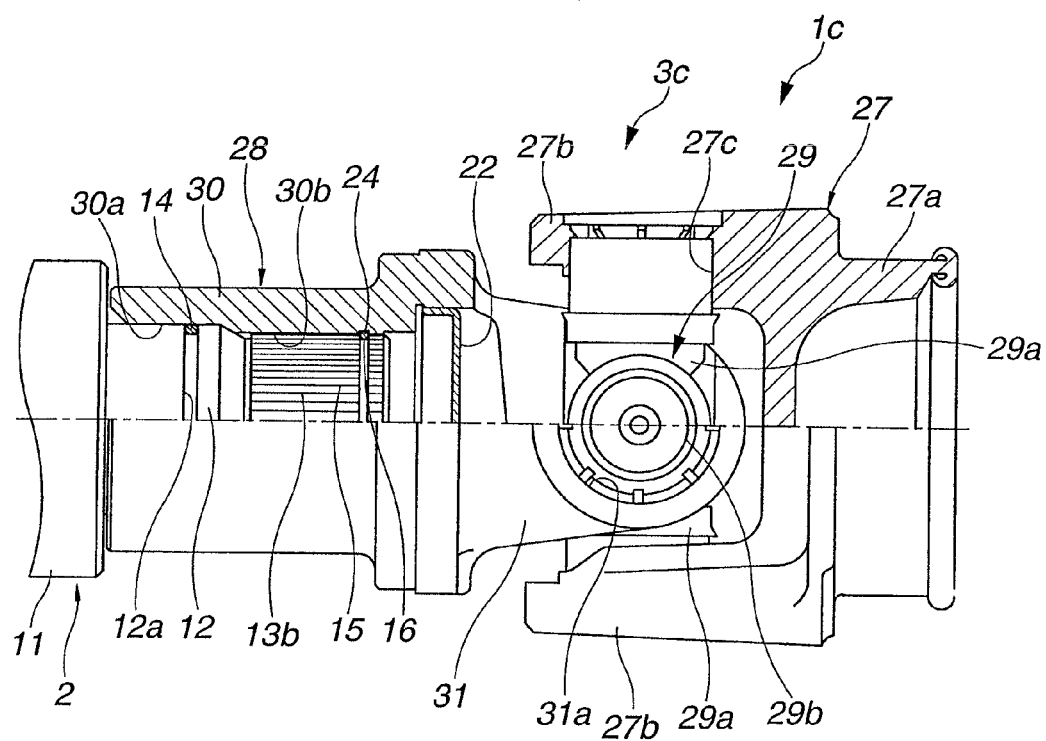
FIG. 8 is a view similar to FIG. 3, but showing an essential part of a front assembly of a propeller shaft of a third embodiment of the present invention.
Figure 9:
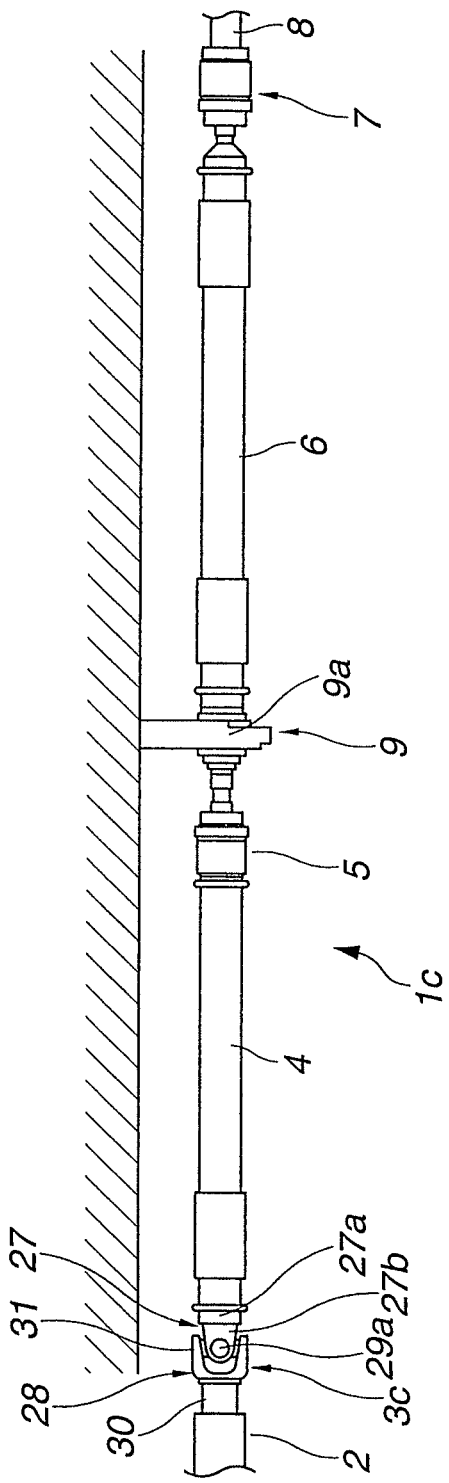
FIG. 9 is a side view of an entire construction of the propeller shaft of the third embodiment of the present invention.

Referring to FIGS. 8 and 9, there is shown a propeller shaft 1c which is a third embodiment of the present invention.

In this third embodiment, arrangement and construction of some joints are different from those of the above-mentioned first embodiment.

That is, in this third embodiment, as is seen from FIG. 8, the universal joint 3c is a Cardan joint and as is seen from FIG. 9, the second constant velocity universal joint 5 is arranged at a right side of drive shaft 4, and the right side joint of driven shaft 6 is a constant velocity universal joint 7.

Referring back to FIG. 8, the universal joint (viz., Cardan joint) 3c comprises an input side yoke 27 that is connected to a left end of drive shaft 4 (see FIG. 9), a sleeve yoke 28 that is connected to input shaft 2 and a cross-shaped spider unit 29 that universally pivotally connects input side yoke 27 and sleeve yoke 28.

As is seen from FIG. 8, input side yoke 27 is made of an aluminum alloy and has a cylindrical right end portion 27a that is connected to the left end of drive shaft 4 and a pair of fork portions 27b that extend leftward from cylindrical right end portion 27a.

The pair of fork portions 27b are formed with aligned bores 27c for rotatably receiving therein first opposed shafts 29a of spider unit 29.

As is seen from FIG. 8, sleeve yoke 28 is made of an aluminum alloy and has a cylindrical left portion 30 that is connected to input shaft 2 and a pair of fork portions 31 that extend rightward from cylindrical left portion 30.

Like in the above-mentioned first embodiment, cylindrical left portion 30 has therein a cylindrical space that is defined by a smoothed cylindrical wall 30a and a splined cylindrical wall 30b.

The pair of fork portions 31 are formed with aligned bores 31a for rotatably receiving therein second opposed shafts 29b of spider unit 29.

Since the connection between input shaft 2 and cylindrical left portion 30 of sleeve yoke 28 is substantially the same as that between input shaft 2 and sleeve portion 21 in the second embodiment, description on that connection will be omitted.

Accordingly, also in this third embodiment, input shaft 2 and universal joint (viz., Cardan joint) 3c are operatively connected through engagement between splines 15 and 30b and the engagement between snap ring 16 and annular groove 24. In other words, also in this third embodiment, for operatively connecting input shaft 2 and the universal joint 3c, no bolts are employed. That is, a torque transmission from input shaft 2 to drive shaft 4 is assuredly carried out without usage of any connecting bolts.

Figure 10:
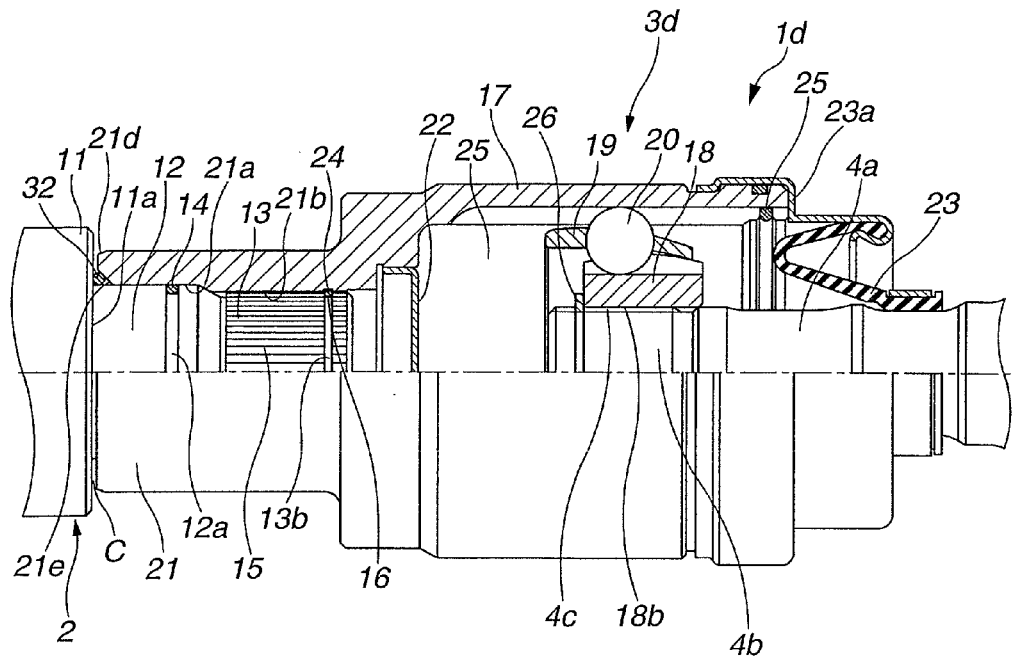
FIG. 10 is a view similar to FIG. 3, but showing an essential part of a front assembly of a propeller shaft of a fourth embodiment of the present invention.

Referring to FIG. 10, there is shown a front assembly of a propeller shaft 1d which is a fourth embodiment of the present invention.

Since the propeller shaft 1d of this fourth embodiment is similar to the propeller shaft 1b of the above-mentioned second embodiment, only portions different from those of the second embodiment will be described in detail in the following.

That is, as is seen from FIG. 10, in this fourth embodiment, in addition to annular seal ring (or first seal ring) 14, a second annular seal ring 32 made of synthetic rubber is used, which is operatively compressed between the peripheral outer edge 21d of sleeve portion 21 and a root part of the intermediate portion 12 of input shaft 2. More specifically, second annular seal ring 32 is tightly received in an annular space defined by the tapered is peripheral inner edge 21e of sleeve portion 21, the root part of the intermediate portion 12 of input shaft 2 and the annular flat surface 11a of input shaft 2. With second annular seal ring 32, the above-mentioned thin space "C" (see FIG. 3) is hermetically closed.

In this fourth embodiment, in addition to the advantages possessed by the above-mentioned second embodiment, the hermeticity of the interior of the first constant velocity universal joint 3d (or 3b) is more assuredly obtained.

Figure 11:
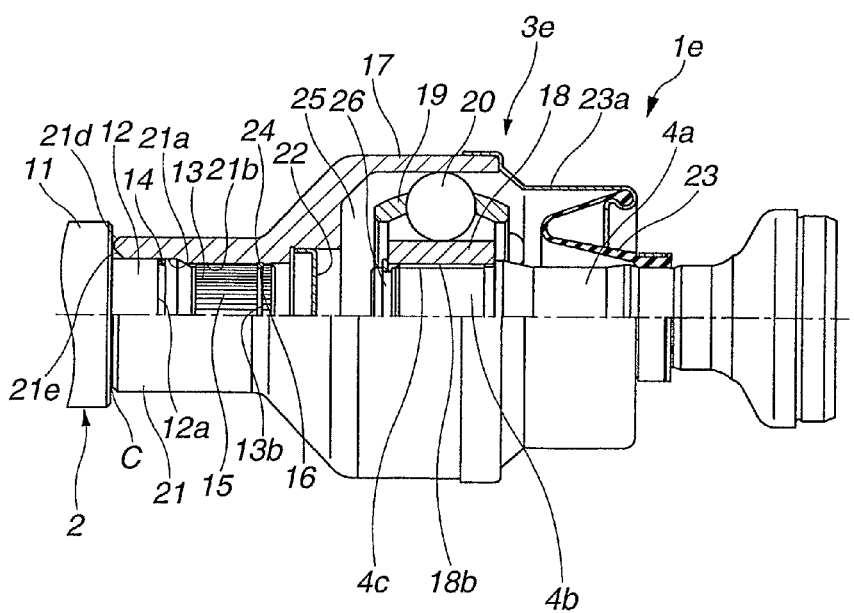
FIG. 11 is a view similar to FIG. 3, but showing an essential part of a front assembly of a propeller shaft of a fifth embodiment of the present invention.

Referring to FIG. 11, there is shown a front assembly of a propeller shaft 1e which is a fifth embodiment of the present invention.

Since the propeller shaft 1e of this fifth embodiment is similar to the propeller shaft 1b of the second embodiment, only portions different from those of the second embodiment will be described in detail in the following.

That is, as is seen from FIG. 11, the difference between the fifth and second embodiments is that in the fifth embodiment, the axial length of outer cylindrical member 17 of first constant velocity universal joint 3e is small.

Due to the shorten axial length of outer cylindrical member 17, the relative axial displacement between the joint 3e and the drive shaft 4 (or stub shaft 4a) is reduced as compared with that provided by the second embodiment. However, the major advantageous feature, that is, "assured torque transmission from input shaft 2 to drive shaft 4 without usage of any connecting bolts" is achieved also in this fifth embodiment.

Figure 12:
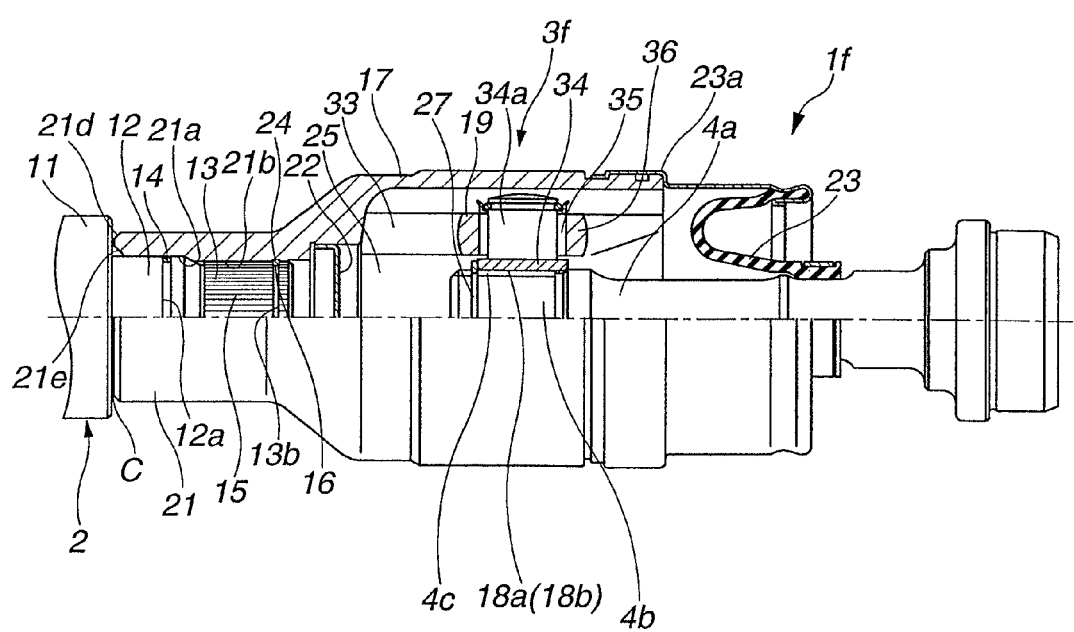
FIG. 12 is a view similar to FIG. 3, but showing an essential part of a front assembly of a propeller shaft of a sixth embodiment of the present invention.

Referring to FIG. 12, there is shown a front assembly of a propeller shaft 1f which is a sixth embodiment of the present invention.

In this sixth embodiment, a tri-port type joint 3f is used as the first constant velocity universal joint.

That is, as is seen from FIG. 12, an inner cylindrical wall of the outer cylindrical member 17 is formed with three axially extending grooves 33 that are arranged at evenly spaced intervals, that is, by an angle of 120 degrees.

An inner cylindrical member 34 is disposed on front part 4b drive shaft 4 through a spline coupling. Inner cylindrical member 34 is formed with three equally spaced short shafts 34a that project radially outward. Around each short shaft 34a, there is rotatably disposed an annular roller 36 through needle bearings 35. As shown, each annular roller 36 has a convex outer surface, and respective annular rollers 36 on the three short shafts 34a of the inner cylindrical member 34 are rotatably received in and guided by the three grooves 33 respectively.

Accordingly, an axial movement of the three annular rollers 36 in and along the grooves 33 permits an axial movement or displacement of drive shaft 4 relative to the tri-port type joint 3f.

Since the connection between input shaft 2 and sleeve portion 21 of outer cylindrical member 17 is substantially the same as that between input shaft 2 and sleeve portion 21 in the second embodiment, description on that connection will be omitted.

Accordingly, also in this sixth embodiment, input shaft 2 and first constant velocity universal joint (viz., tri-port type joint) 3f are operatively connected through the engagement between splines 15 and 21b and the engagement between snap ring 16 and annular groove 24. In other words, also in this sixth embodiment, for operatively connecting input shaft 2 and the joint 3f, no bolts are used. That is, in this sixth embodiment, the torque transmission from input shaft 2 to drive shaft 4 is assuredly carried out without usage of any connecting bolts.

Furthermore, since drive shaft 4 is axially movable relative to the joint 3f, the work for assembling propeller shaft 1f is facilitated.

The entire contents of Japanese Patent Application 2012-64316 filed Mar. 21, 2012 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A propeller shaft comprising:
   an outer cylindrical member formed with a sleeve portion, the sleeve portion having a splined cylindrical inner wall with which a splined cylindrical outer wall of a shaft is engaged;
   an inner cylindrical member installed in the outer cylindrical member;
   a torque transmitting unit through which a torque is transmitted from the outer cylindrical member to the inner cylindrical member;
   a connecting mechanism that, upon engagement of the splined cylindrical outer wall with the splined cylindrical inner wall, effects an axial and relative positioning between the shaft and the outer cylindrical member while establishing a detachable connection therebetween; and
   a length adjusting mechanism that is arranged between the outer cylindrical member and the inner cylindrical member to adjust an axial length of the propeller shaft,
   wherein the connecting mechanism comprises:
      a first annular groove formed on the splined cylindrical inner wall of the sleeve portion, the first annular groove having a trapezoidal cross section; and
      a second annular groove formed on the splined cylindrical outer wall of the shaft, the second annular groove having a rectangular cross section, the second annular groove receiving therein a snap ring that resiliently engages with the first annular groove.

2. A propeller shaft as claimed in claim 1, in which the length adjusting mechanism is constructed to allow the outer and inner cylindrical members to make an axial and relative displacement therebetween through the torque transmission unit.

3. A propeller shaft as claimed in claim 1, further comprising a seal member that establishes a hermetical sealing between an inner wall of the sleeve portion and an outer wall of the shaft upon engagement between the shaft and outer cylindrical member.

4. A propeller shaft as claimed in claim 3, in which the shaft comprises:
   a larger diameter shaft portion; and
   a medium diameter shaft portion integral with and extending axially from the larger diameter shaft portion, the medium diameter shaft portion being received in the sleeve portion upon engagement between the shaft and the outer cylindrical member, wherein
      the seal member is elastically compressed between an outer wall of the medium diameter shaft portion and an inner wall of the sleeve portion at a position near the larger diameter shaft portion.

5. A propeller shaft as claimed in claim 3, in which the seal member comprises a plurality of seal members that are arranged along the axis of the shaft.

6. A propeller shaft as claimed in claim 3, in which the inner wall of the sleeve portion includes the splined cylindrical inner wall and a smoothed cylindrical inner wall, and in which the seal member is arranged at the smoothed cylindrical inner wall.

7. A propeller shaft comprising:
   an outer cylindrical member formed with a sleeve portion, the sleeve portion having a splined cylindrical inner wall with which a splined cylindrical outer wall of a shaft is engaged;
   an inner cylindrical member installed in the outer cylindrical member;
   a torque transmitting unit through which a torque is transmitted from the outer cylindrical member to the inner cylindrical member;
   a connecting mechanism that, upon engagement of the splined cylindrical outer wall with the splined cylindrical inner wall, effects an axial and relative positioning between the shaft and the outer cylindrical member while establishing a detachable connection therebetween; and
   a seal member that establishes a hermetical sealing between an inner wall of the sleeve portion and an outer wall of the shaft upon engagement between the shaft and the outer cylindrical member, wherein:
      the inner wall of the sleeve portion includes the splined cylindrical inner wall and a smoothed cylindrical inner wall;
      the seal member is arranged at the smoothed cylindrical inner wall;
      an outer wall of the shaft includes the splined cylindrical outer wall and a smoothed cylindrical outer wall; and
      the seal member is compressed between the smoothed cylindrical inner wall of the sleeve portion and the smoothed cylindrical outer wall of the shaft.

8. A propeller shaft comprising:
   an outer cylindrical member formed with a sleeve portion, the sleeve portion having a splined cylindrical inner wall into which a splined cylindrical outer wall of a shaft is inserted to establish a spline coupling therebetween;
   an inner cylindrical member connected to the outer cylindrical member through a torque transmitting unit thereby to allow a torque transmission from the outer cylindrical member to a shaft member through the inner cylindrical member and the torque transmitting unit;
   a boot having an outer peripheral portion secured to the outer cylindrical member and an inner peripheral portion secured to the inner cylindrical member thereby to hold in the outer cylindrical member a grease;
   a connecting mechanism that connects the shaft and the outer cylindrical member while establishing an axial and relative positioning therebetween; and
   a seal member that establishes a hermetical sealing between an inner cylindrical wall of the sleeve portion and an outer cylindrical wall of the shaft, the connecting member being arranged between the seal member and the inner cylindrical member; and
   a length adjusting mechanism that is arranged between the outer cylindrical member and the inner cylindrical member to adjust an axial length of the propeller shaft, wherein the connecting mechanism comprises:
      a first annular groove formed on the splined cylindrical inner wall of the sleeve portion, the first annular groove having a trapezoidal cross section; and
      a second annular groove formed on the splined cylindrical outer wall of the shaft, the second annular groove having a rectangular cross section and tightly receiving therein a snap ring that resiliently engages with the first annular groove.

9. A propeller shaft as claimed in claim 8, in which the connecting mechanism is constructed to allow the outer and inner cylindrical members to make an axial and relative displacement therebetween through the torque transmitting unit.

10. A propeller shaft as claimed in claim 9, in which the shaft comprises:
   a larger diameter shaft portion; and
   a medium diameter shaft portion integral with and extending axially from the larger diameter shaft portion, the medium diameter shaft portion being received in the sleeve portion upon engagement between the shaft and the outer cylindrical member, wherein
      the seal member is elastically compressed between an outer wall of the medium diameter shaft portion and an inner wall of the sleeve portion at a position near the larger diameter shaft portion.

11. A constant velocity universal joint comprising:
   a first coupling member formed with a sleeve portion, the sleeve portion having a splined cylindrical inner wall with which a splined cylindrical outer wall of a shaft is engaged;
   a second coupling member installed in the first coupling member;
   a torque transmitting member interposed between the first and second coupling members thereby to carry out a torque transmission therebetween;
   a connecting mechanism that effects an axial and relative positioning between the shaft and the first coupling member while establishing a detachable connection therebetween; and
   a length adjusting mechanism that is arranged between the first coupling member and the second coupling member to adjust an axial length of the constant velocity universal joint, wherein the connecting mechanism comprises:

a first annular groove formed on the splined cylindrical inner wall of the sleeve portion, the first annular groove having a trapezoidal cross section; and a second annular groove formed on the splined cylindrical outer wall of the shaft, the second annular groove having a rectangular cross section and tightly receiving therein a snap ring that resiliently engages with the first groove.

* * * * *